United States Patent [19]

Hasuda et al.

[11] Patent Number: 5,457,514
[45] Date of Patent: Oct. 10, 1995

[54] SHUTTER INSTRUMENTATION DEVICE FOR DETECTING THE OPENING AND THE CLOSING OF A CAMERA SHUTTER

[75] Inventors: Masanori Hasuda, Yokohama; Yukio Uemura, Musashino; Akira Katayama, Koganei; Tetsuro Goto, Funabashi, all of Japan

[73] Assignee: Nikon Corporation, Tokyo, Japan

[21] Appl. No.: 200,322

[22] Filed: Feb. 23, 1994

[30]     Foreign Application Priority Data

Feb. 23, 1993   [JP]   Japan ..................................... 5-057879

[51] Int. Cl.$^6$ ................................. G03B 7/08; G04F 7/10
[52] U.S. Cl. .................. 354/431; 354/246; 354/234.1; 73/5
[58] Field of Search ..................... 354/234.1, 246, 354/456, 247–249, 431; 73/5

[56]     References Cited

U.S. PATENT DOCUMENTS

| | | | |
|---|---|---|---|
| 3,913,376 | 10/1975 | Scott | ............................................ 73/5 |
| 4,907,027 | 3/1990 | Kobe et al. | ...................... 354/234.1 X |
| 5,225,865 | 7/1993 | Shiomi et al. | ...................... 354/456 X |

FOREIGN PATENT DOCUMENTS 58-11925   1/1983   Japan .
58-139132  8/1983   Japan .

*Primary Examiner*—Michael L. Gellner
*Assistant Examiner*—J. K. Han

[57]     ABSTRACT

A camera having a mechanism to determine the precise times at which a shutter or shutter blinds open or close an aperture. The camera measures the actual time in which shutter blinds pass over the aperture by utilizing a projection unit, positioned on one side of the shutter, to project a signal towards the aperture. A signal receiving unit is placed on the other side of the shutter and receives the signal. The output of the signal receiving unit changes depending on whether the signal projected by the projection unit is blocked by the shutter (when the shutter is closed) or whether the projected signal passes through the aperture. The projection unit and the receiving unit can also be placed on the same side of the shutter, with a reflecting unit placed on the other side of the shutter, with the shutter blinds having a different reflectivity than the reflecting unit. When the shutter blinds are closed, the projected signal is reflected off the shutter blinds and received by the receiving unit. When the shutter blinds are open, the projected signal is reflected from the reflecting unit and received by the receiving unit. The output of the receiving unit is different, depending on whether the projected signal was reflected off the shutter blinds or off the reflecting unit. By analyzing the receiving unit output, the state of the shutter can be determined.

18 Claims, 11 Drawing Sheets

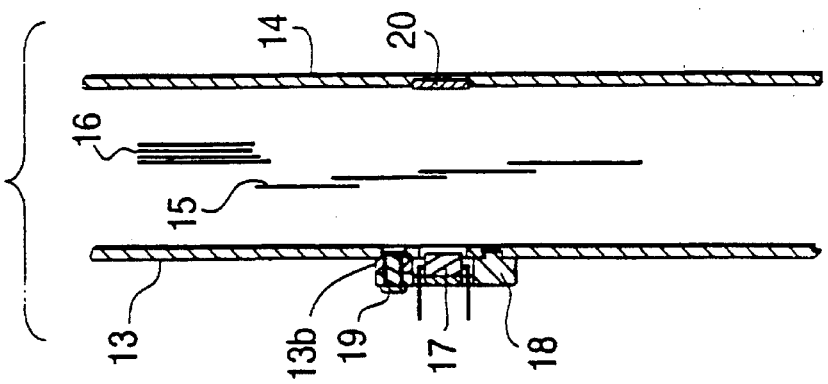
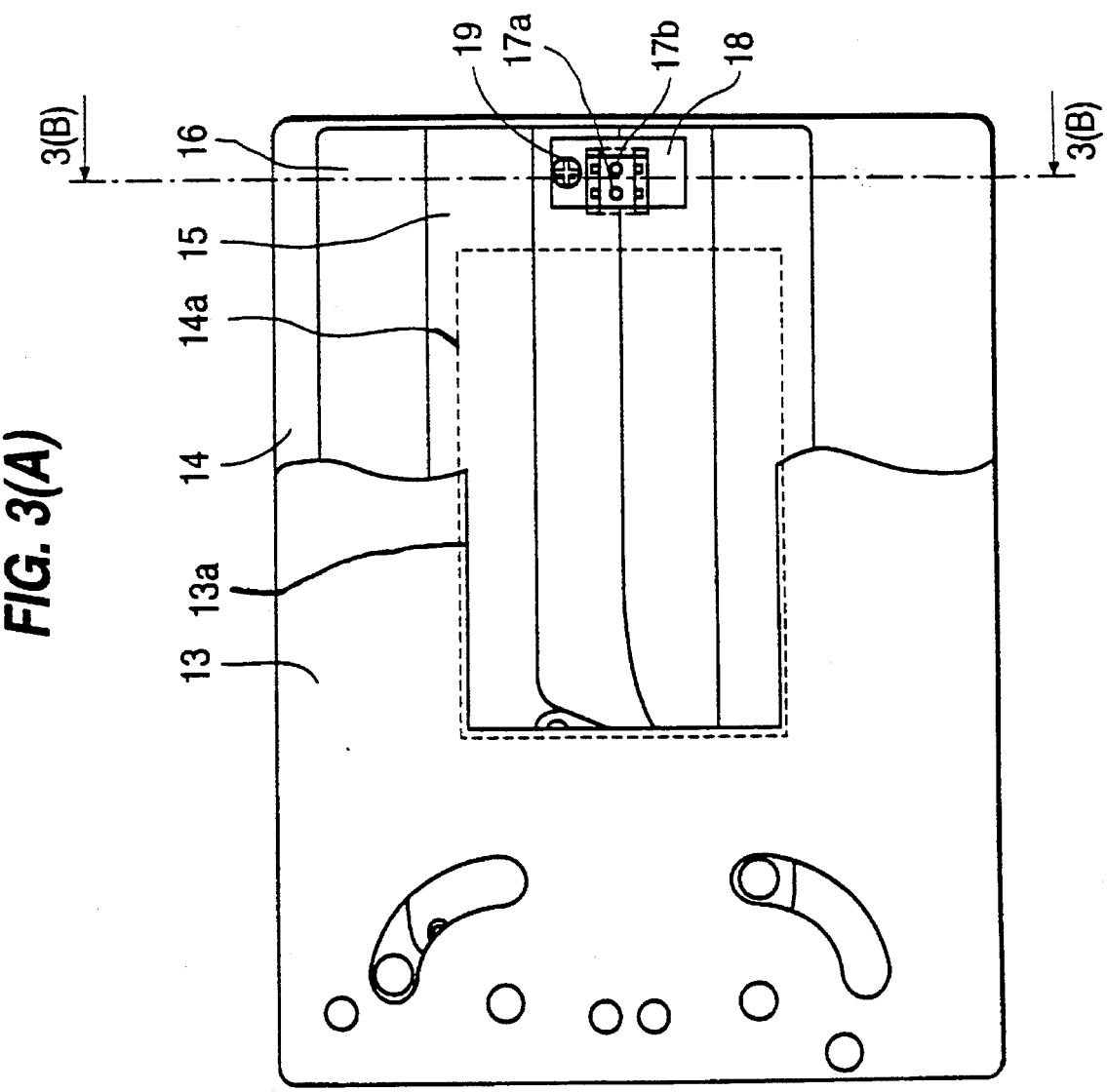

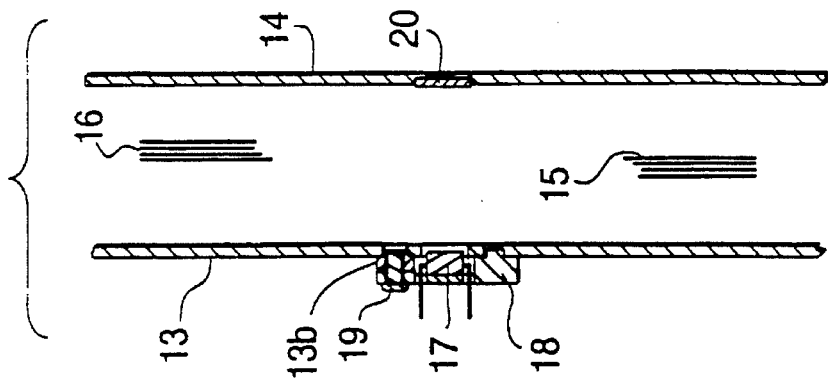
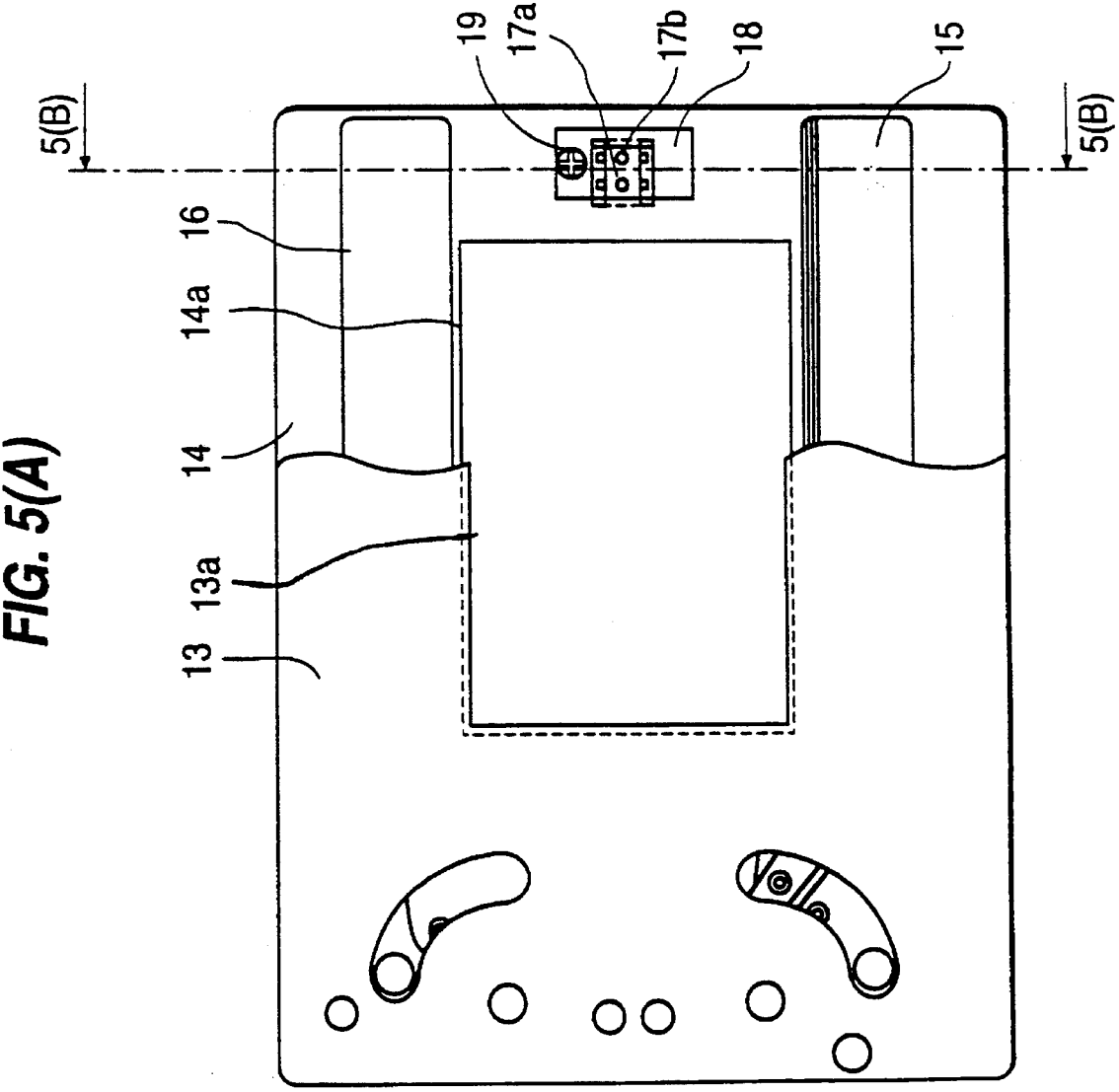

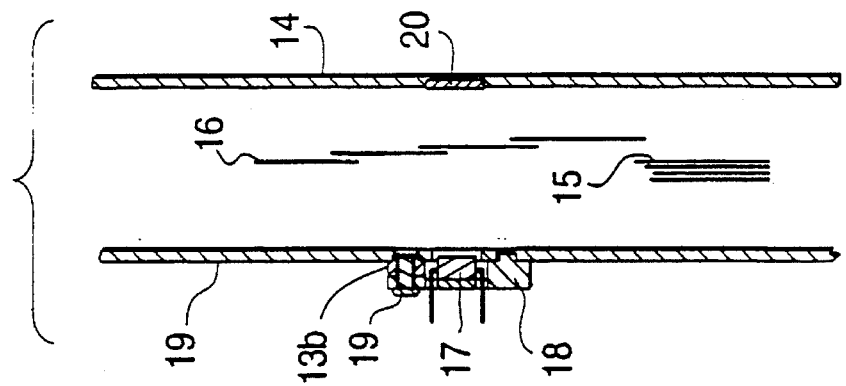
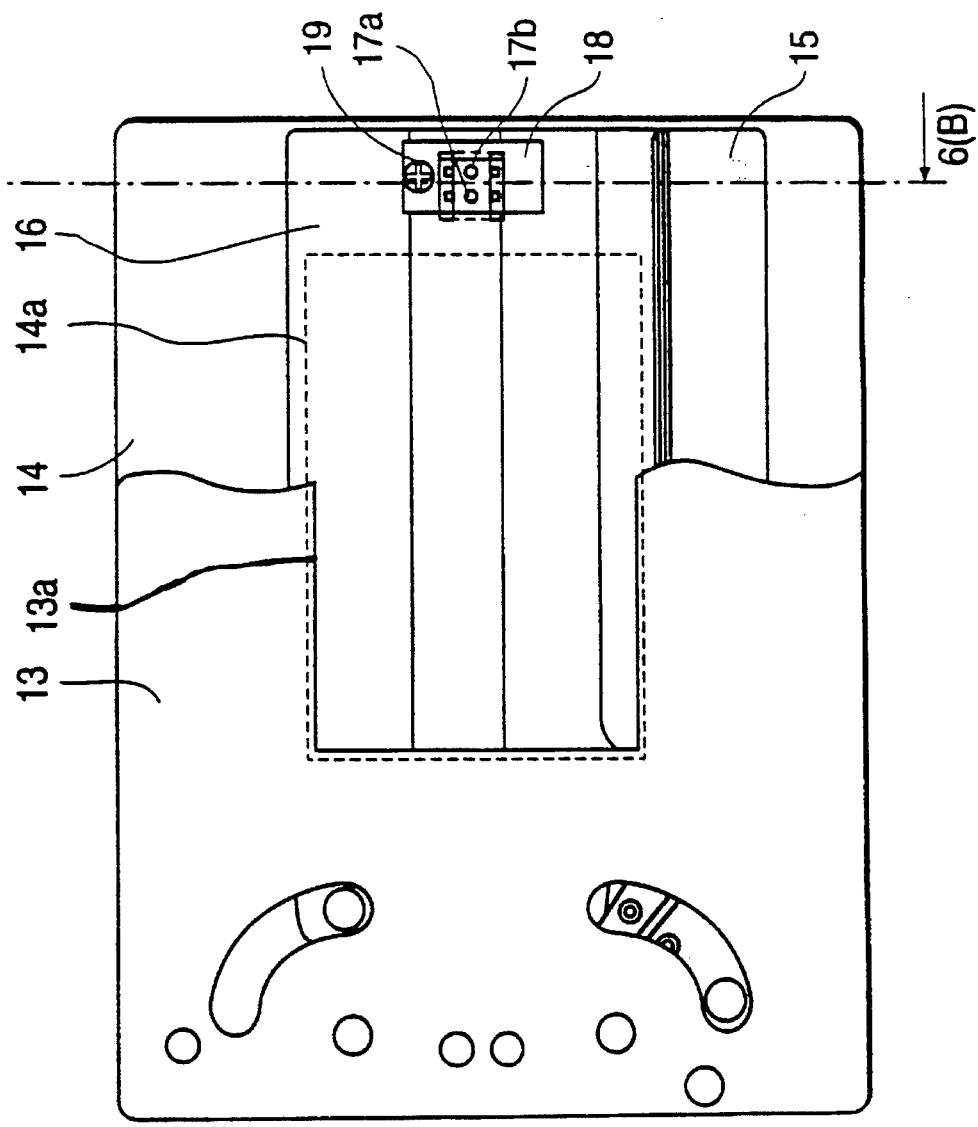

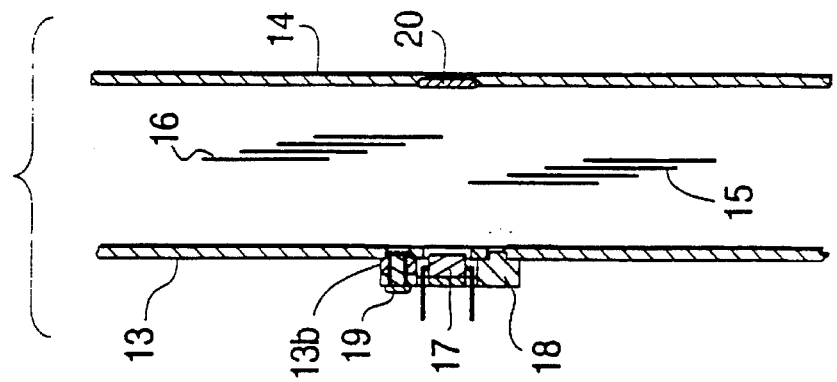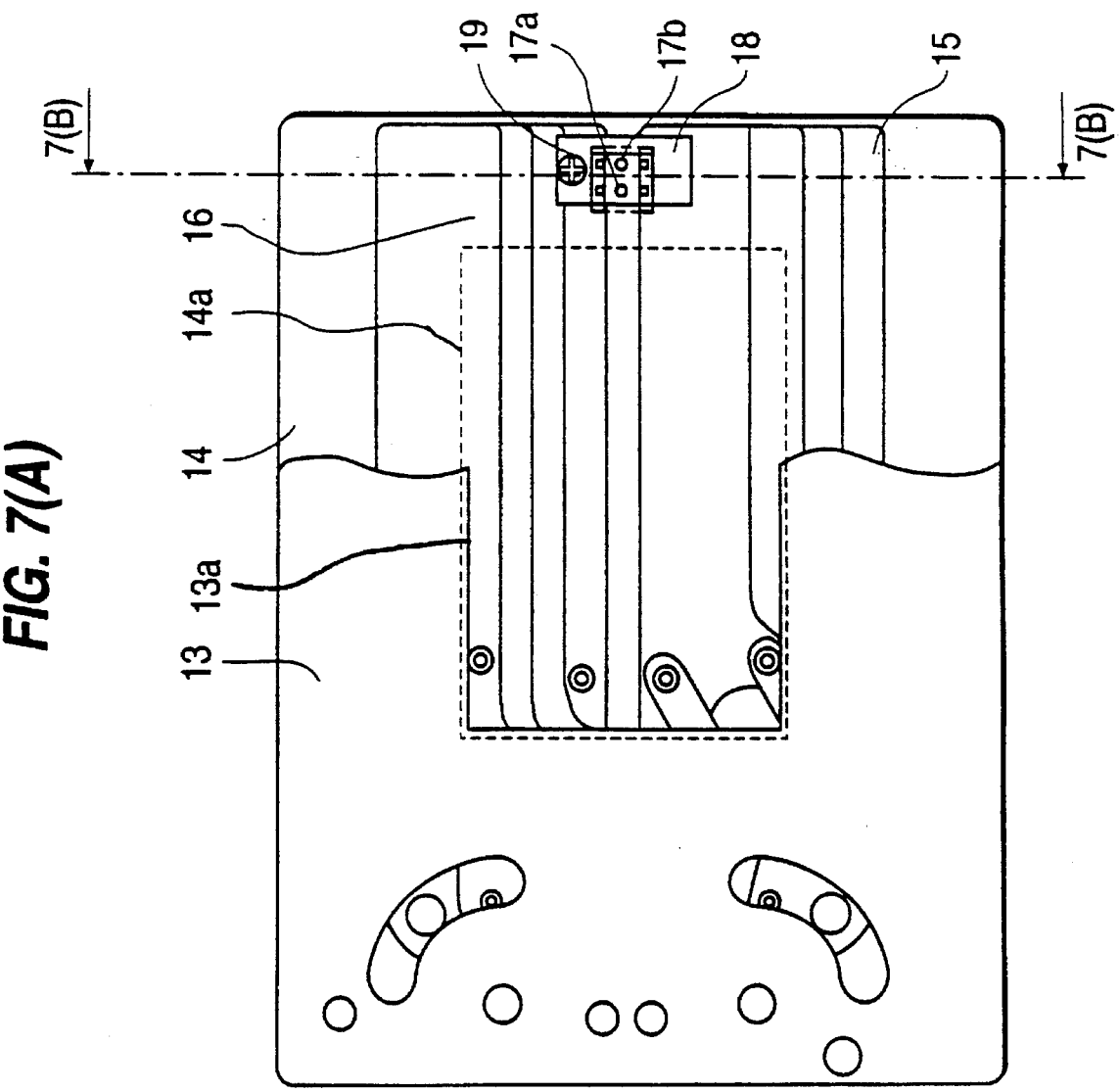

SHUTTER INSTRUMENTATION DEVICE FOR DETECTING THE OPENING AND THE CLOSING OF A CAMERA SHUTTER

BACKGROUND OF THE INVENTION

1. Field of the Invention

The present invention relates to a camera having a shutter instrumentation device to detect the state of travel of a camera shutter.

2. Description of the Related Art

In conventional cameras, light beams from a photographic subject passing through a camera aperture are limited by a stop and the time for exposure of film is limited by a mechanical shutter. A focal plane shutter used in a single lens reflex camera basically consists of two blinds, a front blind and a rear blind. To control film exposure to the light beams from the photographic subject, the front and rear blinds cover the film picture plane so that the film is not exposed.

The front blind initially blocks the aperture, thereby preventing light from reaching the film picture plane. When a photographer presses a release button, the front blind is moved away from the aperture, and exposure of the film picture plane is commenced. After a predetermined time has elapsed, the rear blind moves in a position so that it blocks the aperture and covers the film picture plane. The travel of the front blind and the rear blind is performed mechanically, energized by spring force, and the commencement of travel is performed by releasing a mechanical hold.

Typically, the front and rear blind operations are controlled purely mechanically. However, electrical control has become used in recent years. With electrical control, spring force is used to drive the travel of the front blind and the rear blind, but the engagement and disengagement of a mechanical hold of the front and rear blinds are controlled by passing current to an electromagnet.

Moreover, there is a need to increase the speed of a focal plane shutter. For example, shutter speeds of 1/8,000 second are desirable. In addition, there is a widespread tendency to use strobe, thereby requiring an increase in the synchronized speed of focal plane shutters to allow photography in bright surroundings.

In order to increase the synchronous speed of focal plane shutters, the spring force controlling the front and rear blinds is increased and the front and rear blinds are moved in rapid succession. In addition, by rapidly moving the front and rear blinds, a slit of narrow width is formed. The width of the slit can be controlled by the overlapping motion of the front and rear blinds.

The present invention recognizes that, even with accurate timing of current flow in the electromagnet, the film exposure time cannot be accurately controlled. The actual exposure time depends only on the mechanical travel of the front blind and the rear blind. As displacement elements, there is scatter in the speed of separation of the hold mechanism and the mechanical travel system (which includes a spring). Moreover, these mechanical elements inevitably have varying characteristics due to temperature characteristics or changes with time. These problems become more prevalent when blind travel speeds are increased.

When in an anomalous state, the desired shutter speed is not obtained and the amount of exposure of the film surface becomes excessively insufficient. In extreme cases, the front blind and the rear blind overlap as they travel, with the result that the film is not exposed at all. A converse phenomenon can occur if the blinds do not close, thereby resulting in overexposure.

These problems are especially prevalent in a camera with a shutter having a fast blind speed and narrow slit width.

Also, if any of the above problems occur during photography, the problems cannot be detected until the film is developed. This poses a serious problem since a photographer could continue to take photographs without realizing that the film is not being properly exposed.

Conventional cameras have attempted to determine the shutter state by forming a capacitor with a shutter vane as a "dielectric" between two plates. In this manner, the capacitance is different when the shutter vane is between the two capacitor plates compared to when the shutter vane is not between the two plates. This approach, however, can be inaccurate.

SUMMARY OF THE INVENTION

Accordingly, it is an object of the present invention to provide a camera with improved shutter control by electrically controlling the commencement of shutter blind travel.

It is a further object of the present invention to provide a camera which can accurately measure the state of travel of the shutter while the shutter is actually in operation.

Additional objects and advantages of the invention will be set forth in part in the description which follows and, in part, will be obvious from the description, or may be learned by practice of the invention.

The foregoing objects of the present invention are achieved by providing a camera which includes a shutter mechanism for opening and closing an aperture, the shutter mechanism having different states corresponding to the opening and closing of the aperture, a projection mechanism for projecting a signal towards the shutter mechanism, a receiving unit for receiving signals projected by the projection mechanism, and a control unit for interpreting the signals received by the receiving unit to determine the state of the shutter mechanism.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIGS. 3(A) and 3(B) are a front view and side cross sectional view, respectively, illustrating a shutter in a camera having a shutter instrumentation device according to an embodiment of the present invention.

FIGS. 5(A) and 5(B) are a front view and side cross sectional view, respectively, illustrating a camera having a shutter instrumentation device according to an embodiment of the present invention.

FIGS. 6(A) and 6(B) are a front view and side cross sectional view, respectively, illustrating a camera having a shutter instrumentation device according to an embodiment of the present invention.

FIGS. 7(A) and 7(B) are a front view and side cross sectional view, respectively, illustrating a camera having a shutter instrumentation device according to an embodiment of the present invention.

DESCRIPTION OF THE PREFERRED EMBODIMENTS

Figure 1:
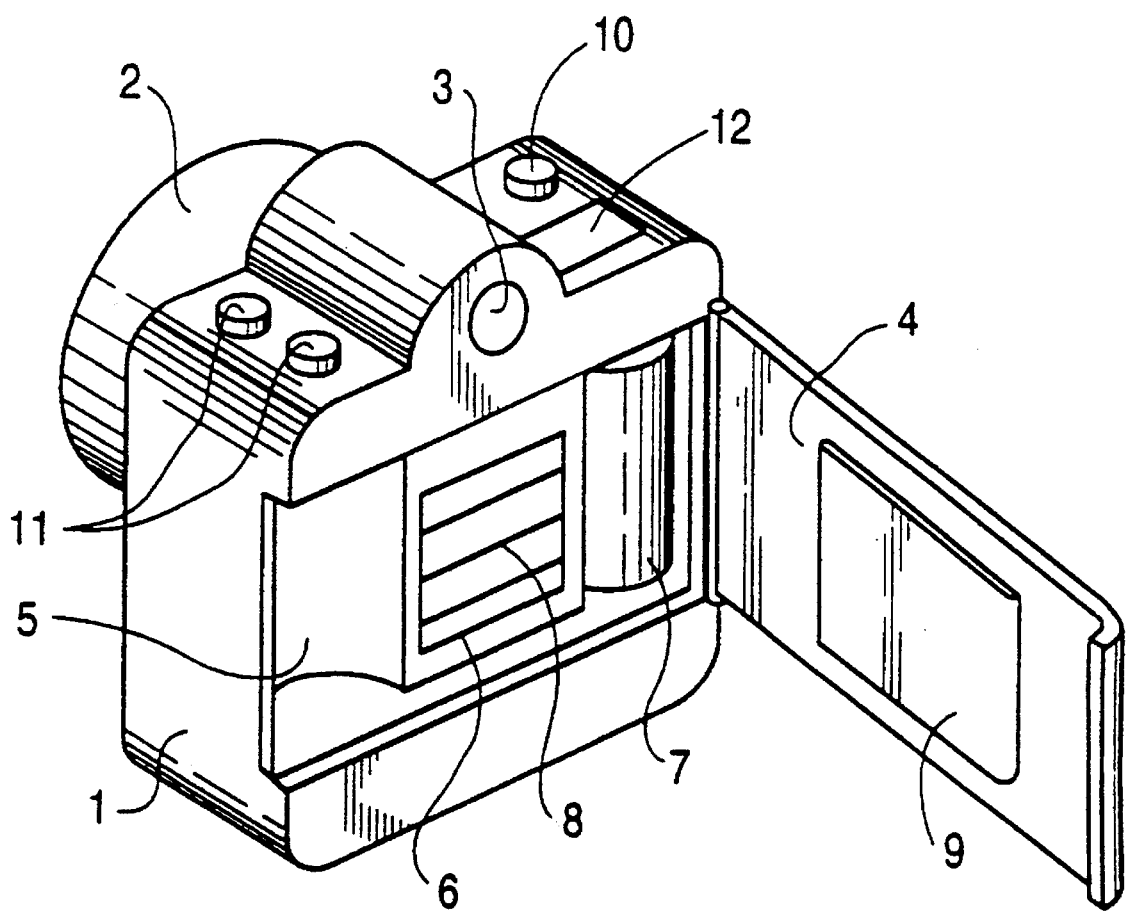
FIG. 1 is an oblique view of a camera having a shutter instrumentation device according to an embodiment of the present invention.

Referring now to the figures, wherein like reference numerals represent similar structures or processes throughout the drawings, and more particularly to FIG. 1 which is an oblique view of a camera having a shutter instrumentation device according to an embodiment of the present invention.

In FIG. 1, a camera 1 has a back cover 4 which is in an open state and a film cartridge (not shown in the drawing) which is loaded into a cartridge compartment 5. Film (not illustrated) drawn out from the cartridge passes over the front surface of aperture 6 and is wound up on spool 7. Pressure plate 9, arranged on the inside of back cover 4, operates to press the film (not illustrated) flat against aperture 6. Shutter 8, arranged on the inside of aperture 6, covers a wider region than aperture 6. Light passes from a photographic subject (not illustrated) via lens 2 through aperture 6 for exposure of the film surface for the predetermined time.

A photographer observes a subject through viewfinder 3 and, by pressing release button 10, begins exposure of the film. The exposure mode and various photographic conditions can be confirmed from display mechanism 12. Moreover, liquid crystal display (LCD) device 32 (see FIG. 2) is built into display mechanism 12.

Plural setting buttons 11 are operating buttons in order to optionally arrange the operating mode and photographic conditions of camera 1. The photographer can perform operations while confirming characters or symbols displayed on display mechanism 12.

Figure 2:
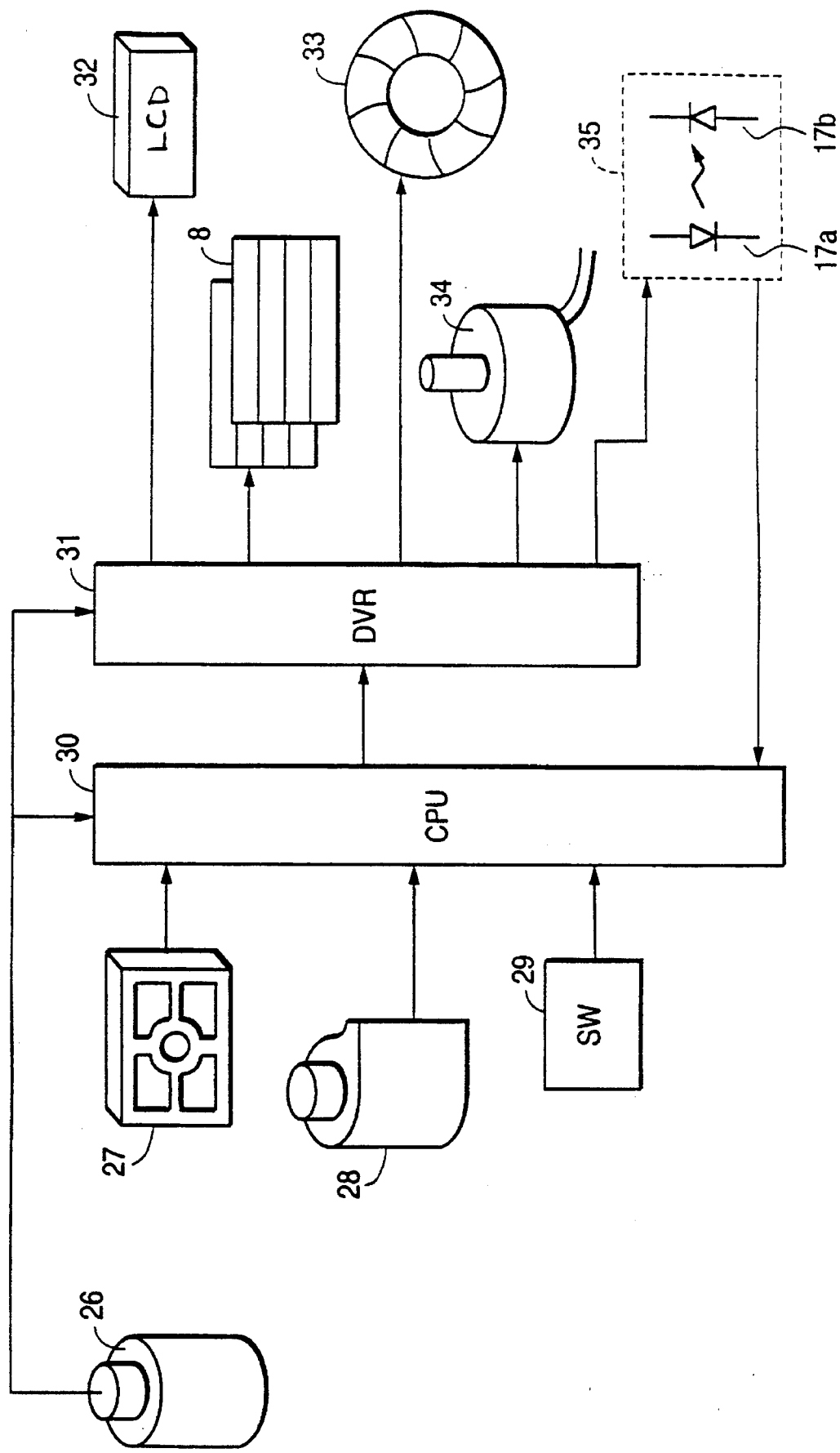
FIG. 2 is a block diagram of a camera having a shutter instrumentation device according to an embodiment of the present invention.

FIG. 2 is a block diagram showing control connections for a camera having shutter instrumentation mechanism according to an embodiment of the present invention.

In FIG. 2, battery 26 is an electric supply for all elements of the camera illustrated in FIG. 2. Control of each element is effected by CPU 30. Input signals to CPU 30 are as follows.

First, photometric mechanism 27 is a sensor mechanism which measures the luminosity in each portion into which a subject is divided and supplies plural measurement values to CPU 30. Film sensitivity detection mechanism 28 reads the signals provided on a side surface or other areas of the loaded film cartridge, and film sensitivity information is supplied to CPU 30 from film sensitivity detection mechanism 28.

Switch (SVV) detection mechanism 29 contains hand operated switches, including switches coupled to release button 10, plural setting buttons 11, or timing switches (not illustrated) for the detection of the sequence state of the camera. Camera state information is supplied by switch detection mechanism 29 to CPU 30.

CPU 30 controls shutter blind travel state detection mechanism 35 which includes a light projecting element (for example, light emitting diode) 17a. In addition, CPU 30 receives signals emitted from a light receiving mechanism (for example, photodiode or phototransistor) 17b included in shutter blind travel state detection mechanism 35.

CPU 30 carries out the following operations through driver (DVR) mechanism 31.

Exposure information, information relating to the operating mode settings, warning information or other photographic information, is displayed by driving liquid crystal display (LCD) device 32. Moreover, CPU 30 controls the operating time interval (that is, exposure time) of shutter 8. The amount of light passing through shutter 8 is controlled by driving stop 33 within lens 2. Furthermore, CPU 30 controls winding, rewinding and forwarding of the film by driving motor 34. CPU 30 also controls the energizing of a shutter drive spring (not illustrated).

FIGS. 3(A) and 3(B) are a front view and side cross sectional view, respectively, to show the shutter 8, comprised by front blind 15 and rear blind 16, in a camera having a shutter instrumentation device according to an embodiment of the present invention.

Referring to FIGS. 3(A) and 3(B), the shutter blind travel state detection mechanism 35 includes optical sensor 17 and reflecting member 20. Optical sensor 17 has an operating state detection function and includes a light projecting mechanism 17a (LED or similar light emitting element), which has a light projecting function, and a light receiving mechanism 17b (photodiode, phototransistor or similar light receiving element) for receiving light.

Optical sensor 17 is disposed on the left-hand surface (FIG. 3(B)) of shutter board 13. Shutter board 13 is located on the inside of cover plate 14. Shutter 8 includes front blind 15 and rear blind 16. Front blind 15 and rear blind 16 travel between shutter board 13 and cover plate 14 (see FIG. 3(B)). Front blind 15 and rear blind 16 have the function of controlling the exposure time of the film picture plane and are constituted by plural (for example, four) vanes. Front blind 15 and rear blind 16 respectively move between a position which covers aperture 6 (FIG. 1) and a position which opens aperture 6 (FIG. 1).

Optical sensor 17 is located in the right-hand side center portion of shutter board 13 so that the vane tips of front blind 15 and rear blind 16 pass over optical sensor 17. Light projecting mechanism 17a and light receiving mechanism 17b of optical sensor 17 face the right-hand side (cover plate 14 side) of shutter board 13.

Reflecting member 20 is affixed to the left-hand side of cover plate 14 in a position illuminated by light emitted from light projecting mechanism 17a. Accordingly, light emitted from light projecting mechanism 17a is reflected by front blind 15 and rear blind 16 or by reflecting member 20, and passes to light receiving mechanism 17b. The reflectivity of reflecting member 20 is arranged to be a higher reflectivity than the reflectivity of the optical sensor side of front blind 15 and rear blind 16. For example, reflecting member 20 should have a reflectivity of 70% or more, while the optical sensor side of front blind 15 and rear blind 16 should have a reflectivity of 25% or less.

Moreover, it is possible to reverse the positional relation of optical sensor 17 and reflecting member 20. Therefore, it is possible for optical sensor 17 to be disposed on the left-hand side of cover plate 14, and for reflecting member 20 to be disposed on the left-hand surface of shutter board 13.

Shutter board 13 has collar 13b in order to fix holder 18 such as by a screw 19. Holder 18 is fixed to the location of optical sensor 17. Holder 18 is loaded with optical sensor 17. Shutter board 13 has aperture 13a and cover plate 14 has aperture 14a. Cover plate 14 has the function of fixing reflecting member 20. Apertures 13a and 14a have the same function as aperture 6 (FIG. 1).

FIGS. 3(A) and 3(B) show the state of front blind 15 and rear blind 15 before release button 10 is pressed. In other words, FIGS. 3(A) and 3(B) represent the camera state before the commencement of an exposure. Vanes of front blind 15 are mutually slightly overlapping, and extend so as to cover apertures 13a and 14a. Rear blind 16 is overlapped, in a standby position upwards of apertures 13a and 14a. In this embodiment, an optical sensor is used which has a low output level when the amount of light received is low and which has a high output level when the amount of light received is high. However, it is also possible to use an optical sensor 17 in which the relationship between the amount of light received and the output level is reversed.

In the camera state shown in FIGS. 3(A) and 3(B), front blind 15 (having a low reflectivity) is facing the optical sensor 17 and the amount of light received by light receiving mechanism 17b is low. Accordingly, the output of the optical sensor 17 is at a low level.

A front blind magnet (not illustrated) is used to disengage the hold of front blind 15 and front blind 15 is moved away by being folded upwards or downwards of apertures 13a and 14a. Front blind 15 is therefore moved to a position which opens apertures 13a and 14a. Exposure of the film is commenced.

Figure 4:
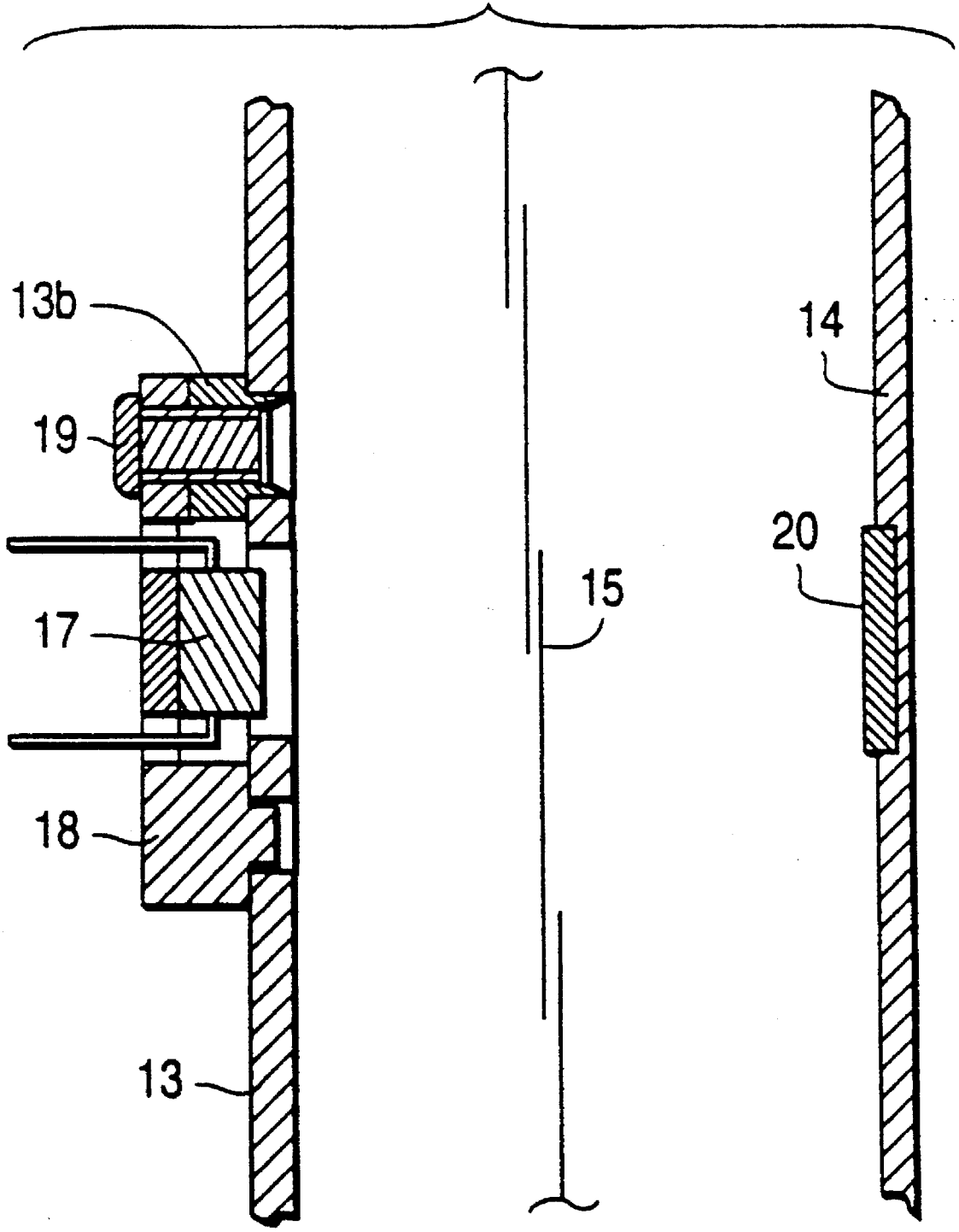
FIG. 4 is a side cross sectional view showing a camera having a shutter instrumentation device according to an embodiment of the present invention.

FIG. 4 is a side cross sectional view showing a camera having a shutter instrumentation device according to an embodiment of the present invention. Optical sensor 17 and reflecting member 20 are shown in detail.

The following is a method of and related assembly for fixing optical sensor 17 to shutter board 13. An entrance hole for entry of optical sensor 17 is opened at the location of optical sensor 17 in shutter board 13. Optical sensor 17 is fixed with adhesive in holder 18. Holder 18 is fixed in shutter board 13 by collar 13b, caulked in shutter board 13, and fixed with screw 19.

Reflecting member 20 is fixed with adhesive in a concavity or recess of cover plate 14 in a position opposite optical sensor 17 and with front blind 15 and rear blind 16 inserted between reflecting member 20 and optical sensor 17.

FIGS. 5(A) and 5(B) are a front view and side cross sectional view, respectively, of a camera having a shutter instrumentation device according to an embodiment of the present invention. FIG. 5 illustrates a state in which the travel of front blind 15 has ended and before the travel of rear blind 16 has commenced.

In FIGS. 5(A) and 5(B), by actuating a front blind magnet (not illustrated), front blind 15 is moved to a position in which apertures 13a and 14a are open. Exposure of the film is performed over the entire surface of apertures 13a and 14a. At this time, because the reflecting member 20 (having high reflectivity) faces optical sensor 17, the amount of light received at light receiving mechanism 17b is high. Accordingly, the output of optical sensor 17 becomes a high level.

After this state, the hold of rear blind 16 is disengaged by a rear blind magnet (not illustrated) and rear blind 16 moves downwards from the position shown in FIG. 5(B) so that rear blind 16 widely faces apertures 13a and 14a. Apertures 13a and 14a are thus covered by rear blind 16 and a predetermined time of the exposure is completed.

FIGS. 6(A) and 6(B) are a front view and side cross sectional view, respectively, of a camera having a shutter instrumentation device according to an embodiment example of the present invention. FIGS. 6(A) and 6(B) show a state in which the travel of rear blind 16 has ended.

In FIG. 6, by actuating a rear blind magnet (not illustrated), rear blind 16 is moved to a position in which apertures 13a and 14a are covered. The state is such that only rear blind 16 covers apertures 13a and 14a. At this time, because rear blind 16 (having low reflectivity) is facing optical sensor 17, the amount of light received at light receiving mechanism 17b is low. Accordingly, the output of optical sensor 17 is at a low level.

After the state shown in FIG. 6, a windup mechanism (not illustrated) advances the film by one frame and an unexposed portion of the film is newly positioned in a location facing apertures 13a and 14a. A charge mechanism (not illustrated) pulls front blind 15 and rear blind 16 in the upward direction of apertures 13a and 14a, and the shutter state reverts to that illustrated in FIGS. 3(A) and 3(B).

FIGS. 7(A) and 7(B) are a front view and side cross sectional view, respectively, of a camera having a shutter instrumentation device according to an embodiment of the present invention. FIGS. 7(A) and 7(B) illustrate a state of high speed travel of shutter 8 (which includes front blind 15 and rear blind 16).

For a short exposure time, the movement of rear blind 16 is commenced to a position covering apertures 13a and 14a before front blind 15 moves to a position to open apertures 13a and 14a. Accordingly, the appearance is that a slit is formed by front blind 15 and rear blind 16. Exposure of the film is performed by passing front blind 15 and rear blind 16 across apertures 13a and 14a.

In FIGS. 7(A) and 7(B), the state is shown in which the slit formed by front blind 15 and rear blind 16 faces optical sensor 17. At this time, because reflecting member 20 (having high reflectivity) is facing optical sensor 17, the amount of light received at light receiving mechanism 17b is high. Accordingly, the output of optical sensor 17 is at a high level.

FIGS. 8(A), 8(B), 8(C) and 8(D) are time charts illustrating the shutter action in a camera having a shutter instrumentation device according to an embodiment of the present invention.

Figure 8A:
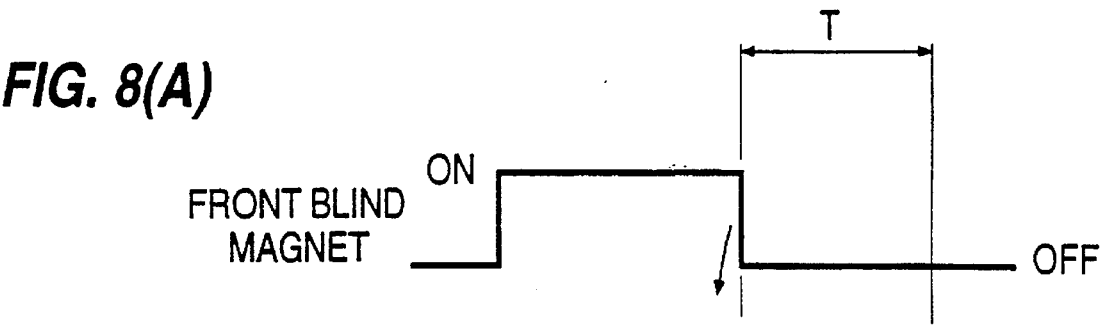
FIGS. 8(A), 8(B), 8(C) and 8(D) are timing diagrams illustrating the action in a camera having a shutter instrumentation device according to an embodiment of the present invention.
Figure 8B:
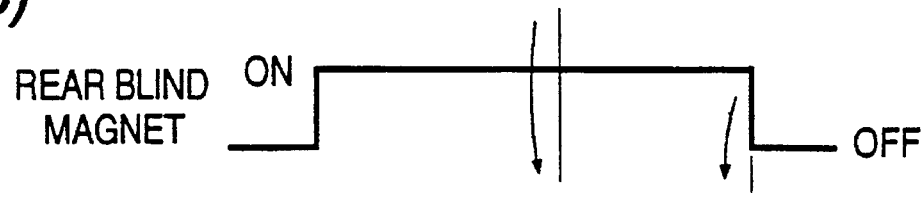
Figure 8C:
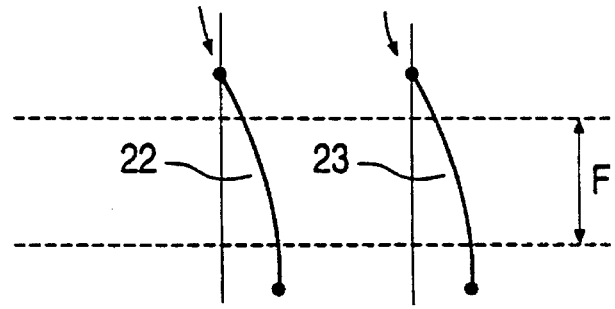
Figure 8D:
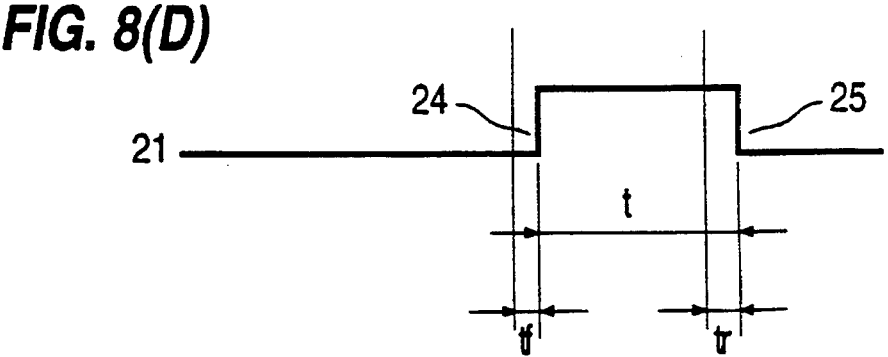

FIGS. 8(A) and 8(B) respectively show the ON/OFF timing of the front blind magnet and the rear blind magnet. FIG. 8(C) shows the state of travel of front blind 15 and rear blind 16, changing due to the ON/OFF timing of the front blind and rear blind magnets, respectively. FIG. 8(D) shows the changes in the detection signal of the optical sensor 17.

In FIGS. 8(A), 8(B), 8(C) and 8(D), tr is the time from commencement of travel of rear blind to the passage of rear blind 16 across optical sensor 17; tf is the time from commencement of travel of front blind 15 to the passage of front blind 15 across optical sensor 17. T is a control time, and is a target value for the exposure time. t is the exposure time measured by optical sensor 17. Line 21 illustrates the output of optical sensor 17. Curve 22 shows the travel of front blind 15 and curve 23 shows the travel of rear blind 16. Output change 24 and output change 25 show the timing of reversals of optical sensor output 21.

When release button 10 (FIG. 1) is pressed, current is passed through the front blind magnet and the rear blind magnet, thereby performing an electrical holding of front blind 15 and rear blind 16. Before depressing release button 10, mechanical holding is performed. Pressing release button 10 causes a changeover from mechanical holding to electrical holding by the front blind magnet and the rear blind magnet.

After this changeover, lens 2 (FIG. 1) is stopped down (by a stopping mechanism which is not illustrated), and a reflecting mirror (not illustrated) is raised into the optical path.

After a time tf from the front blind magnet being set OFF, front blind 15 passes during its travel across optical sensor 17. Upon this passing, a surface facing optical sensor 17 changes over from front blind 15 (of low reflectivity) to reflecting member 20 (of high reflectivity). Therefore, optical sensor output 21 reverses at output change 24 so that optical sensor output 21 changes from low level to high level.

Furthermore, after control time T has elapsed from output change 24 (T is the previously set exposure time), the rear blind magnet becomes OFF. This causes rear blind 16 to traverse the aperture portion F (see FIG. 8(C)) according to curve 23. At this time, because the rear blind magnet is OFF, rear blind 16 passes across in front of optical sensor 17 after a time tr has elapsed. Because a surface facing optical sensor 17 changes over from reflecting member 20 (of high reflectivity) to rear blind 16 (of low reflectivity), the optical sensor output 21 reverses at output change 25, reverting from a high level to a low level.

The interval is measured of output change 24 and 25 of optical sensor output 21. This interval exists from when front blind 15 opens aperture 6 until rear blind 16 closes aperture 6. This interval represents the true exposure time t.

For example, an exposure control circuit appropriately controls the predetermined control time T and drives the front and rear blind magnets at appropriate times. An erroneous action of the mechanical system which actuates front blind 15 and rear blind 16 can be detected if the control time t obtained from optical sensor 17 is different from the predetermined time T.

Furthermore, after each magnet becomes OFF, front blind 15 and rear blind 16 travel past optical sensor 17 and the times tr and tf are respectively measured. In this manner, the travel speed (blind speed) of front blind 15 and rear blind 16 can be determined. In the case in which the times tr and tf are longer than a target value, the travel of the blinds is slow; on the other hand, when tr and tf are faster than the target value, it can be determined that the travel of the blinds is too fast. Therefore, it is possible to determine the irregularity of the exposure and correct for this irregularity by, for example, changing T.

Figure 9:
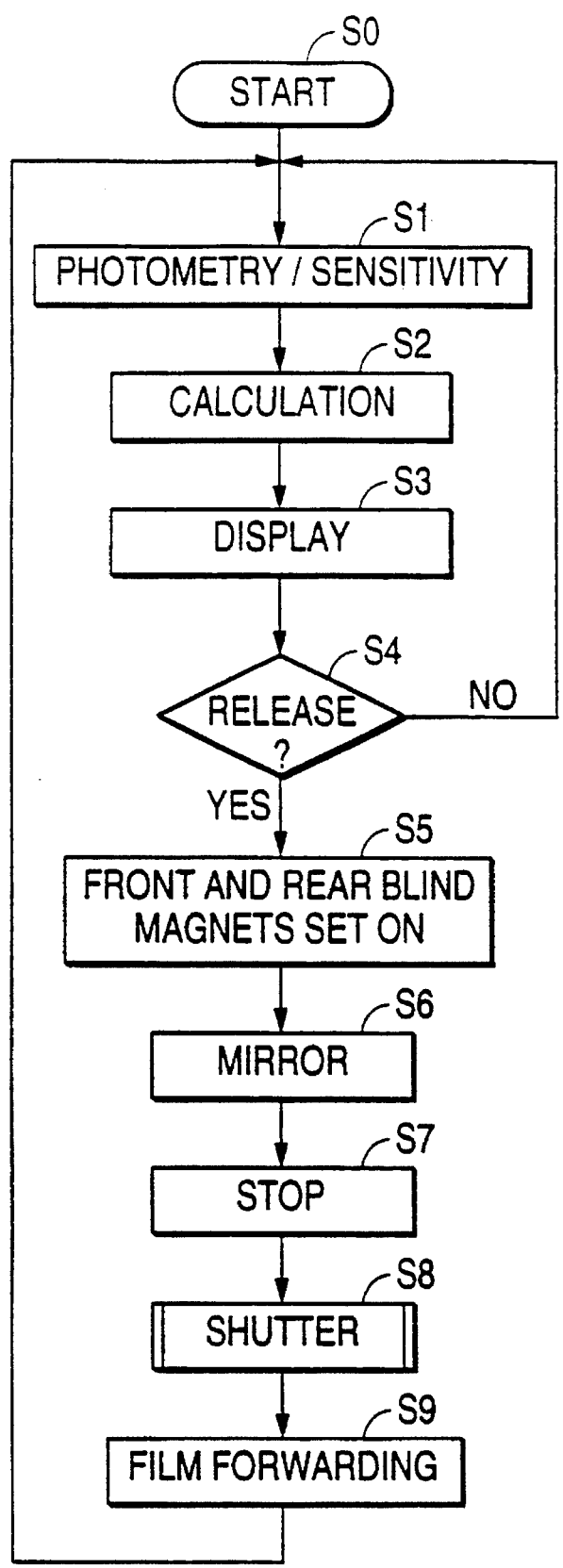
FIG. 9 is a flow chart illustrating the overall operational control in a camera having a shutter instrumentation device according to an embodiment of the present invention.

FIG. 9 is a flow chart for a camera having a shutter instrumentation device according to an embodiment of the present invention. FIG. 9 shows the processing routine of CPU 30 of the camera. The routine shown in FIG. 9 is performed repeatedly during the supply of current to CPU 30.

In FIG. 9, the process starts in step S0. In step S1, a photometric signal and a sensitivity signal are input to CPU 30 from photometric mechanism 27 and film sensitivity detection mechanism 28, respectively. In step S2, appropriate exposure conditions of shutter time and stop value are calculated from the photometric signal and the sensitivity signal input in step S1. In step S3, the exposure conditions determined in step S2 are displayed on liquid crystal display device 32. In step S4, it is determined via switch detection mechanism 29 whether or not release switch 10 has been pressed. In the case that the release switch 10 has not been pressed, the process returns to step S1.

In step S4, if release button 10 has been pressed, then in the next step S5 front blind and rear blind magnets are set ON. In step S6, a reflecting mirror (not illustrated) is raised and moved into the photographic light path. In step S7, stop 33 is controlled to a predetermined stop aperture. In step S8, shutter 8 (which includes front blind 15 and rear blind 16) is opened and closed, thereby controlling exposure of the film.

In step S9, since the action of exposure is completed, motor 34 (FIG. 2) is normally rotated and the forwarding of the film and the energizing action of spring mechanisms (not illustrated) driving front blind 15 and rear blind 16 are performed. Since the exposure action has run its course, the above processing is repeated, returning to step S1.

Figure 10:
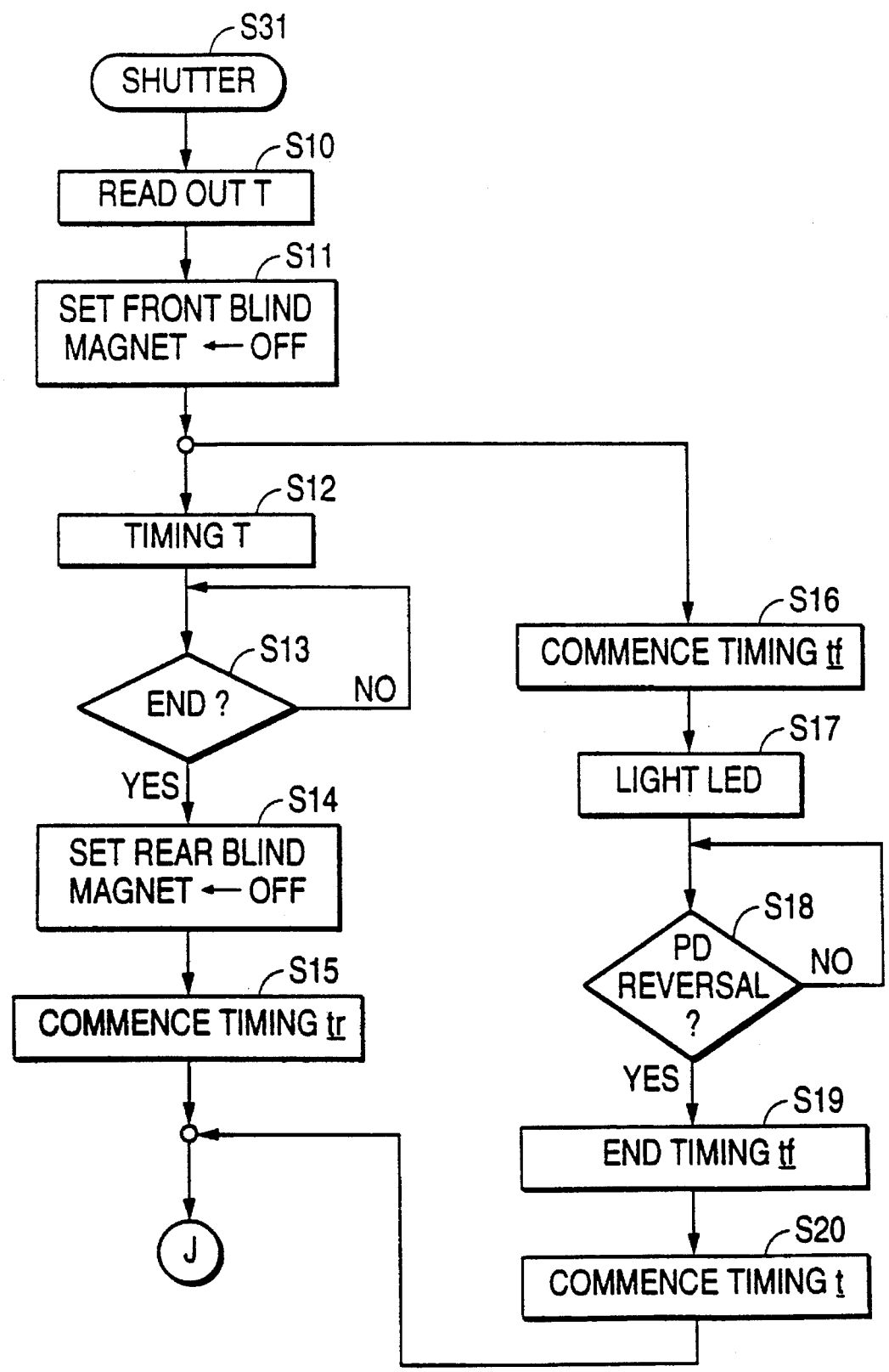
FIGS. 10 and 11 are flow charts illustrating the control of a shutter detection operation in an a camera having a shutter instrumentation device according to an embodiment of the present invention.
Figure 11:
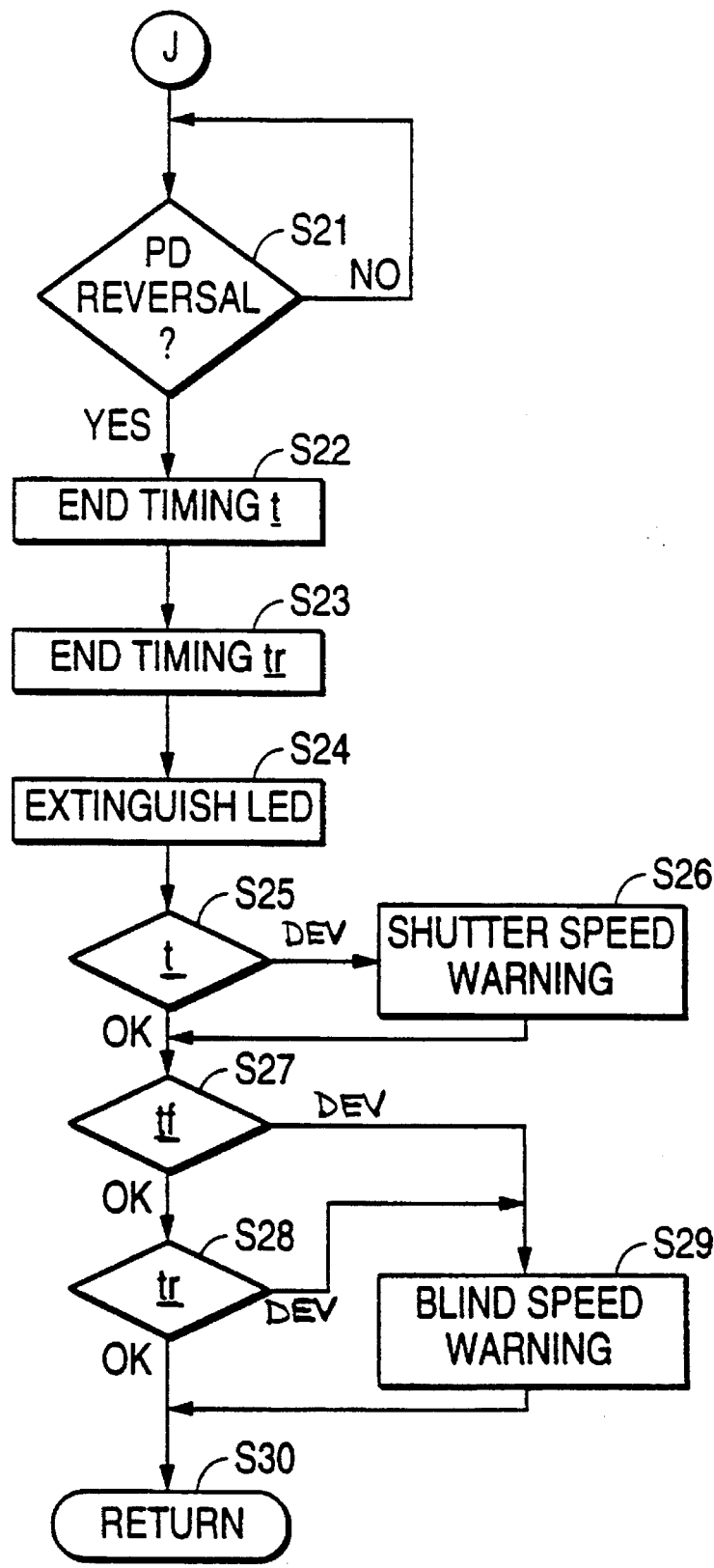

FIGS. 10 and 11 are flow charts which illustrate the details of shutter control in step S8 of FIG. 9.

Processing starts from step S31. In step S10, the control time T (obtained in step S2 of FIG. 9) is read. In step S11, passage of current to the front blind magnet ends by front blind magnet being turned OFF, and the travel of the front blind 15 commences. After this, the processes respectively included in step S12 and S16 are simultaneously performed. Moreover, to simplify the following discussion, the control time T in the present embodiment of the present invention has been exemplified by the case in which the travel time of front blind 15 and rear blind 16 is long.

In step S12, timing of the control time T is commenced. In step S13, the system waits for the control time T to expire. In step S14, since the control time T has ended, the passage of current to the rear blind magnet ends by rear blind magnet being turned OFF and the travel of rear blind 16 is commenced. In step S15, the system begins to measure tr.

In step S16, the system begins to measure tf. In step S17, the lighting of the light projecting mechanism 17a commences. In step S18, a reversal (output change 24) of the output of the light receiving mechanism 17b due to the passage of front blind 15 is awaited. In step S19, the measurement of tf ends. In step S20, the system begins to measure t.

In step S21, a reversal (output change 25) of the output of light receiving mechanism 17b is awaited. In step S22, the measurement of tr ends, and t is found. In step S23, the measurement of tr ends and tr is found. In step S24, light projecting mechanism 17a is extinguished. In step S25, it is determined whether or not the measurement time t is within the range of the allowed time.

In the case in which it is determined in step S25 that there is a deviation (designated DEV in FIG. 11) from the allowed time, a shutter speed warning is performed in step S26 and displayed on liquid crystal display device 32. This warning is a notification to the effect that the exposure time does not satisfy the predetermined value. If it is determined in step S25 that t is within the allowed range, it is determined in step S27 whether or not the travel time tf of front blind 15 is within a predetermined time.

In the case in which it is determined in step S27 that the travel time tf of front blind 15 deviates from the predetermined time, a blind speed warning is performed in step S29 and displayed on liquid crystal display device 32. This warning is a notification to the effect that the exposure time does not satisfy the predetermined value. If it is determined in step S27 that tf is within the allowed region, it is determined in step S28 whether or not the travel time tr of rear blind 16 is within the predetermined time.

In the case in which it is determined in step S28 that the travel time tr of rear blind 16 deviates from the predetermined time, a blind speed warning is performed in step S29 and displayed on liquid crystal display device 32. This warning is a notification to the effect that the exposure time does not satisfy the predetermined value.

In the case in which it is determined in step S28 that tr is within the predetermined time, in the case that a blind speed warning had been performed in step S29, the routine returns to step S9 (FIG. 9).

If tr or tf is not within an appropriate predetermined time, the system can compensate by changing the control time T to reflect the deviation in tf or tr.

As previously described, the output of optical sensor 17 becomes low when front blind 15 or rear blind 16 comes in between optical sensor 17 and reflecting member 20. This low output results because the amount of projected light of optical sensor 17 reflected by the front blind 15 or the rear blind is relatively low and, therefore, the amount of light received by the optical sensor 17 is low. When front blind 15 or rear blind 16 does not come in between optical sensor 17 and reflecting member 20, the amount of projected light of optical sensor 17 reflected by reflecting member 20 becomes high since reflecting member 20 and optical sensor 17 come to be in a facing relationship. Therefore, the output of the optical sensor 17 becomes high.

In summary, when shutter 8 is open, the output of optical sensor 17 becomes high; when the shutter is closed, the output of optical sensor 17 becomes low.

As a result, it is possible to measure the time when front blind 15 and rear blind 16 pass across the position at which optical sensor 17 is positioned by detecting a change in output of optical sensor 17. Therefore, it is possible to electrically detect the time for which a recording medium (such as film) is actually exposed by front blind 15 and rear blind 16. Moreover, by measuring the time from the front blind magnet and rear blind magnet being set OFF until the output of optical sensor 17 reverses, the blind speed of front blind 15 and rear blind 16 can be detected. It therefore becomes possible to determine an exposure irregularity. As a result, it is also possible to detect successively and electrically the action states when the shutter 8 (which includes front blind 15 and rear blind 16) is actually operated. This detection is impossible with convention cameras.

Furthermore, because the reflectivity of reflecting member 20 is higher than the reflectivity of front blind 15 and rear blind 16, the output of optical sensor 17 becomes low when aperture 6 is covered by front blind 15 or rear blind 16 and, when aperture 6 is opened by front blind 15 and rear blind 16, the output of optical sensor 17 becomes high. In this manner, the amount of output change of optical sensor 17 accompanying the state of action of shutter 8 is increased and stable and accurate timing becomes possible.

Even if the reflectivity of front blind 15 and rear blind 16 is specifically determined, the distance from front blind 15 and rear blind 16 to optical sensor 17 can vary. There is also a possibility of the distance from optical sensor 17 to front blind 15 and rear blind 16 changing according to the behavior of front blind 15 and rear blind 16. The effect of this change is that the amount of projected light which is reflected changes, the amount of light entering light receiving mechanism 17b changes, and the possibility arises that the output of optical sensor 17 may become unstable. In the worst case, the detection of the state of travel becomes impossible.

Therefore, in a preferred embodiment, a method and assembly are used in which reflecting member 20 is fixed, independently of the front blind 15 and the rear blind 16, to a member (in the embodiment, the cover plate 14) which does not move. Also, the reflectivity of front blind 15 and rear blind 16 is arranged to be lower than the reflectivity of reflecting member 20 and the amount of change of the output of optical sensor 17 due to the behavior of front blind 15 and rear blind 16 can be negligibly small in comparison with the output of optical sensor 17 due to reflecting member 20. In addition, because the output of optical sensor 17 due to reflecting member 20 becomes practically constant, it becomes possible to exclude states in which detection is impossible due to the behavior of front blind 15 and rear blind 16.

The preferred embodiments of a camera according to the present invention can also be modified so that a light projection mechanism 17a and light receiving mechanism 17b are located on opposite sides of shutter 8, without the use of reflecting member 20. In this manner, the signal received by light receiving mechanism 17b will be different when aperture 6 is open compared to when aperture 6 is closed. The output of light receiving mechanism 17b will also change when front blind 15 or rear blind 16 passes over aperture 6 to prevent light projected by light projecting mechanism 17a from being received by light receiving mechanism 17b.

However, in a method and assembly in which light projecting mechanism 17a is located on a surface on one side of shutter 8 (which includes front blind 15 and rear blind 16) so as to face a light receiving mechanism 17b located on a surface on the other side of the shutter 8, an area has to be maintained on a surface on both sides of shutter 8 in order to locate the light projecting mechanism 17a and the light receiving mechanism 17b. In a preferred embodiment, such an area exists on shutter board 13 side and on cover plate 14 side. Furthermore, when arranging the wiring for light protecting mechanism 17a and light receiving mechanism 17b, wiring would have to be taken from surfaces on both sides of shutter 8 and an extra space would have to be maintained for wiring.

However, in another preferred embodiment of the camera according to the present invention, the light projecting mechanism 17a and the light receiving mechanism 17b are preferably located integrally on a surface on one side of shutter 8, and a light reflecting member 20 is located on the other side of shutter 8, facing light projecting mechanism 17a and light receiving mechanism 17b. In this manner, the area required for light projecting mechanism 17a and light receiving mechanism 17b is minimized and moreover, wiring is relatively easy and wiring space is minimized.

In the embodiments of the camera according to the present invention, a reflecting member 20 is disposed to reflect the projected light of a light projecting mechanism 17a. The camera of the present invention compares the light reflected by reflecting member 20 and received by a light receiving mechanism 17b with the case in which the projected light of light projecting mechanism 17a is reflected by a shutter mechanism (front blind 15 and rear blind 16) and received by light receiving mechanism 17b. It therefore becomes possible to stably and accurately measure the state of travel of the shutter.

In a preferred embodiment of the camera, signals projected and received are light signals; however, various types of signals along the electromagnetic spectrum can be used. In addition, the film should not be sensitive to the signals.

Although a few preferred embodiments of the camera according to the present invention have been shown and described, it will be appreciated by those skilled in the art that changes may be made in these embodiments, without departing from the principles and the spirit of the invention, the scope of which is defined in the claims and their equivalents.

What is claimed is:

1. A camera having an aperture for exposing film to light from a photographic subject, the camera comprising:

a shutter mechanism for opening and closing the aperture, said shutter mechanism having different states corresponding to the opening and closing of the aperture;

a projection unit, fixed to the camera, for projecting signals towards said shutter mechanism;

a reflecting unit, fixed to the camera, for reflecting signals projected by said projection unit;

a receiving unit, fixed to the camera, for receiving signals projected by said projection unit and reflected by said reflecting unit, signals receiving by said receiving unit travelling from said projection unit to said receiving unit along a path which does not pass through the aperture; and control unit for interpreting the signals received by said receiving unit to determine the state of said shutter mechanism.

2. A camera as in claim 1, wherein said shutter mechanism has a first side and a second side, said reflecting unit being positioned adjacent to the first side of said shutter mechanism, and said projecting mechanism and said receiving unit are both positioned adjacent to the second side of said shutter mechanism so that said receiving unit receives signals projected by said projecting unit and reflected off said shutter mechanism and signals projected by said projection unit and reflected off said reflecting unit.

3. A camera as in claim 2, wherein said reflecting unit has a different reflectively than said shutter mechanism.

4. A camera as in claim 3, wherein the reflectivity of said reflecting unit is greater than the reflectivity of said shutter mechanism.

5. A camera as in claim 3, wherein the reflectivity of said reflecting unit is lower than the reflectivity of said shutter mechanism.

6. A camera as in claim 2, wherein the signals projected by said projection unit and received by said receiving unit are light signals.

7. A camera as in claim 1, wherein the signals projected by said projection unit and received by said receiving unit are light signals.

8. A camera as in claim 1, further comprising:

a camera control unit for controlling one of said shutter mechanism and said camera in response to the state of said shutter mechanism as determined by said control unit.

9. A camera having an aperture for exposing film to light from a photographic subject, comprising:

a shutter mechanism for opening and closing an aperture, said shutter mechanism comprising a front blind, having a side A and a side B, and a rear blind, having a side C and a side D, said front blind and said rear blind being substantially parallel with each other, with side B of said front blind adjacent to side C of said rear blind, said shutter mechanism having different states corresponding to the opening and closing of the aperture;

a projection unit, fixed to the camera, for projecting signals towards said shutter mechanism, positioned adjacent to side A of said front blind;

a reflecting unit, fixed to the camera, for reflecting signals projected by said projection unit, positioned adjacent to side D of said rear blind;

a receiving unit, fixed to the camera, for receiving signals projected by said projection unit and reflected off said front blind, for receiving signals projected by said projection unit and reflected off said rear blind and for receiving signals projected by said projection unit and reflected off said reflecting unit, the signals received by said receiving unit travelling from said projection unit to said receiving unit along a path which does not pass through the aperture, said receiving unit positioned adjacent to side A of said front blind; and a control unit for interpreting the signals received by said receiving unit to determine the state of said shutter mechanism.

10. A camera as in claim 9, wherein said projection unit projects light signals.

11. A camera as in claim 9 wherein said reflecting unit has a different reflectivity than said front blind or said rear blind.

12. A camera as in claim 11, wherein said reflecting unit has a higher reflectivity than said front blind or said rear blind.

13. A camera as in claim 11, wherein said reflecting unit has a lower reflectivity than said front blind or said rear blind.

14. A camera as in claim 9, further comprising:

a camera control unit for controlling one of said shutter mechanism and said camera in response to the state of said shutter mechanism as determined by said control unit.

15. A camera having an aperture for exposing film to light from a photographic subject comprising:

a shutter mechanism for opening and closing an aperture, said shutter mechanism including a front blind, having a side A and a side B, and a rear blind, having a side C and a side D, said front blind and said rear blind being substantially parallel with each other, with side B of said front blind adjacent to side C of said rear blind, said shutter mechanism having different states corresponding to the opening and closing of the aperture;

a projection unit, fixed to the camera, for projecting signals towards said shutter mechanism, positioned adjacent to side D of said rear blind;

a reflecting unit, fixed to the camera, for reflecting signals projected by said projection unit, positioned adjacent to side A of said front blind;

a receiving unit, fixed to the camera, for receiving signals projected by said projection unit and reflected off said shutter mechanism and for receiving signals projected by said projection unit and reflected off said reflecting unit, the signals received by said receiving unit travelling along a path which does not pass through the aperture, said receiving unit positioned adjacent to side D of said rear blind; and a control unit for interpreting the signals received by said receiving unit to determine the state of said shutter mechanism.

16. A camera as in claim 15, further comprising:

a camera control unit for controlling one of said shutter mechanism and said camera in response to the state of said shutter mechanism as determined by said control unit.

17. A camera as in claim 15, wherein said reflecting unit has a different reflectivity than said front blind or said rear blind.

18. A camera as in claim 17, wherein said reflecting unit has a higher reflectivity than said front blind or said rear blind.

* * * * *